J. M. Clark,
Water Wheel,
№ 49,380.          Patented Aug. 15, 1865.
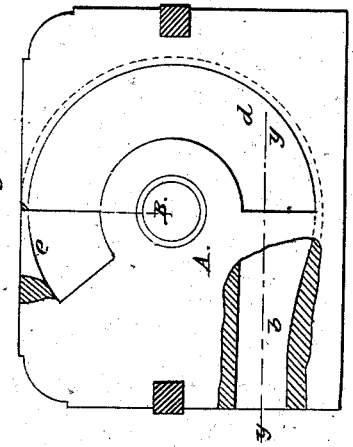
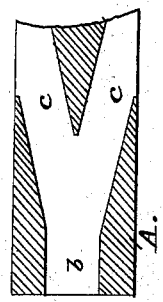
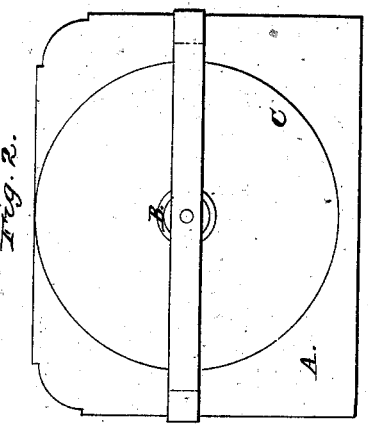
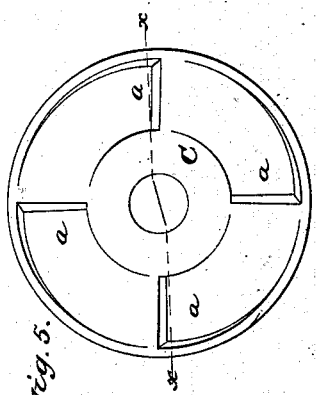
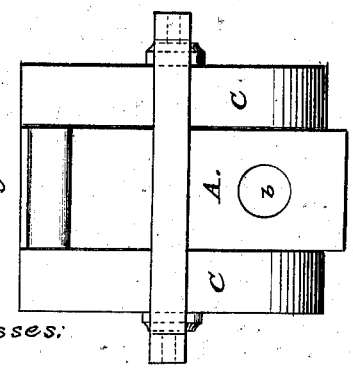
Witnesses:        Inventor.

UNITED STATES PATENT OFFICE.

JOHN M. CLARK, OF BATTERY E, PENNSYLVANIA LIGHT ARTILLERY.

IMPROVEMENT IN WATER-WHEELS.

Specification forming part of Letters Patent No. 49,380, dated August 15, 1865.

*To all whom it may concern:*

Be it known that I, JOHN M. CLARK, of Battery E, Pennsylvania Light Artillery, have invented a new and Improved Water-Wheel; and I do hereby declare that the following is a full, clear, and exact description thereof, which will enable others skilled in the art to make and use the same, reference being had to the accompanying drawings, forming part of this specification, in which—

Figure 1 is an end view of my invention; Fig. 2, a side view of the same; Fig. 3, a side view of the block or water-way, partly in section; Fig. 4, a detached section of one of the wheels, taken in the line $x\ x$, Fig. 5; Fig. 5, a detached inner side view of Fig. 4; Fig. 6, a section of a portion of Fig. 3, taken in the line $y\ y$.

Similar letters of reference indicate like parts.

This invention relates to a new and improved water-wheel, which is also applicable for use with steam as a motor.

The invention consists in the employment or use of two wheels placed on one and the same shaft, with a block between them, having water ways or passages made in it, and all arranged to operate as herein set forth.

A represents a block, through which a shaft, B, passes loosely and is allowed to rotate freely, said shaft having two wheels, C C, keyed or otherwise secured upon it, one at each side of the block A. (See Fig. 1.) The wheels C C run in close contact with the sides of the block A, and they may be described as circular disks notched or scooped out at their inner sides to form buckets $a$, the shape or form of which will be fully understood by referring to Fig. 4.

The block A has an opening or passage, $b$, made in it, which is divaricated at its inner end to form two outlets, $c\ c$, which communicate with the lower ends of spiral grooves or passages $d$, made one in each side of the block A, said grooves or passages being in the form of a semicircle equal in width to the buckets and extending around one-half the wheel, the grooves being deepest, or extending into the block A to the greatest depth, at the lower ends and gradually decreasing in depth to their upper ends, where they are flush with the exterior of A.

In the block A, adjoining the upper ends of the grooves or passages $d\ d$, there is an opening, $e$, which serves as an escape.

The operation will be readily understood. The water is admitted into the opening or passage $b$, and is conducted by the passages $c\ c$ to the buckets $a$ of the two wheels C C, against which it acts, the water escaping from the buckets as the latter pass the upper ends of the grooves $d$ in the sides of the block A.

When the device is used as a water-wheel, one-quarter of the block A may be removed, as indicated by the dotted red lines in Fig. 3. For steam I design to have the exhaust at $e$.

I claim as new and desire to secure by Letters Patent—

The two wheels C C, provided with buckets $a$, as shown, and keyed on one and the same shaft, B, in combination with the block A, provided with the water-passages $b\ c\ c$, grooves $d\ d$, and escape-passages $e$, all arranged to operate substantially as and for the purpose set forth.

JOHN M. CLARK.

Witnesses:
R. V. KING,
H. B. SMITH.